US012804447B2

(12) United States Patent
Kamiyoshikawa et al.

(10) Patent No.: US 12,804,447 B2
(45) Date of Patent: Nov. 17, 2026

(54) WIRELESS SYSTEM AND GROUND-VEHICLE TRANSMISSION METHOD

(71) Applicant: Mitsubishi Electric Corporation, Tokyo (JP)

(72) Inventors: Naoki Kamiyoshikawa, Tokyo (JP); Tetsuya Aoyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 281 days.

(21) Appl. No.: 18/667,201

(22) Filed: May 17, 2024

(65) Prior Publication Data

US 2024/0306029 A1 Sep. 12, 2024

Related U.S. Application Data

(63) Continuation of application No. PCT/JP2021/042987, filed on Nov. 24, 2021.

(51) Int. Cl.

| | |
|---|---|
| ***H04W 28/02*** | (2009.01) |
| ***B61L 15/00*** | (2006.01) |
| ***B61L 27/70*** | (2022.01) |
| ***H04W 4/42*** | (2018.01) |
| ***H04W 76/10*** | (2018.01) |
| ***H04W 76/14*** | (2018.01) |

(52) U.S. Cl.

CPC ..... *H04W 28/0226* (2013.01); *B61L 15/0027* (2013.01); *B61L 27/70* (2022.01); *H04W 4/42* (2018.02); *H04W 76/10* (2018.02); *H04W 76/14* (2018.02); *Y02T 90/16* (2013.01)

(58) Field of Classification Search

CPC . H04W 28/0226; H04W 76/10; H04W 76/14; H04W 4/42; B61L 27/70; B61L 15/0027; Y02T 90/16

See application file for complete search history.

(56) References Cited

U.S. PATENT DOCUMENTS

| | | | |
|---|---|---|---|
| 10,681,524 | B2 | 6/2020 | Kawakami et al. |
| 10,757,709 | B2 | 8/2020 | Uchiyama et al. |
| 11,457,447 | B2 | 9/2022 | Uchiyama et al. |
| 2010/0309866 | A1 | 12/2010 | Katayama et al. |

(Continued)

FOREIGN PATENT DOCUMENTS

| | | | | |
|---|---|---|---|---|
| DE | 4406720 A1 * | 8/1995 | | B61L 11/08 |
| JP | 2010/283632 A | 12/2010 | | |

(Continued)

OTHER PUBLICATIONS

International Search Report (PCT/ISA/210), issued in PCT/JP2021/042987, dated Feb. 8, 2022.

*Primary Examiner* — Angela Widhalm De Rodriguez

(74) *Attorney, Agent, or Firm* — Birch, Stewart, Kolasch & Birch, LLP

(57) ABSTRACT

A T2X system includes: a wireless device installed on a ground along a track; and a plurality of wireless devices installed on a train in a line from a head side to a rear side of the train. When the wireless device installed on the ground and the plurality of wireless devices installed on the train perform communication using proximity service, a limitation is placed such that only one of the plurality of wireless devices is connected to the wireless device installed on the ground.

6 Claims, 8 Drawing Sheets

(56) References Cited

U.S. PATENT DOCUMENTS

| | | | |
|---|---|---|---|
| 2021/0323593 | A1 | 10/2021 | Aoyama et al. |
| 2022/0417923 | A1 | 12/2022 | Uchiyama et al. |

FOREIGN PATENT DOCUMENTS

| | | | | |
|---|---|---|---|---|
| JP | 2015-119425 | A | | 6/2015 |
| JP | 2018016097 | A | * | 2/2018 |
| JP | 6669041 | B2 | | 3/2020 |
| WO | WO 2020/148893 | A1 | | 7/2020 |

* cited by examiner

WIRELESS SYSTEM AND GROUND-VEHICLE TRANSMISSION METHOD

CROSS-REFERENCE TO RELATED APPLICATION

This application is a continuation application of International Application PCT/JP2021/042987, filed on Nov. 24, 2021, and designating the U.S., the entire contents of which are incorporated herein by reference.

BACKGROUND OF THE INVENTION

1. Field of the Invention

The present disclosure relates to a wireless system including a wireless device installed on the ground and a wireless device installed on a train, and a ground-vehicle transmission method that is a communication method for the wireless system.

2. Description of the Related Art

In order to ensure safe operation of trains, methods of monitoring persons and obstacles on tracks on the ground from moving trains have attracted attention. Examples of the ground include areas near station platforms, railroad crossings, and construction sites. An example of a method of implementing monitoring of persons and obstacles on tracks is to implement monitoring by transmitting a video from the ground to a vehicle using Proximity Service (ProSe) in Device to Device (D2D) communication and displaying the transmitted video on, for example, a video display installed in a cab. By applying this method, it is also possible to implement transmission of vehicle log data from the vehicle to a ground station installed at, for example, the entrance of a rail yard while the vehicle is moving. The rail yard includes a detention line.

Japanese Patent No. 6669041 discloses a technique for performing resource sensing of D2D communication in an in-vehicle communication system. The in-vehicle communication is Vehicle to Everything (V2X) communication.

For transmission of a video from the ground to the vehicle, in order to continue monitoring until the tail of the train passes through the monitoring range, a plurality of wireless devices may be disposed on the vehicle so that the wireless devices on the vehicle can receive the video from the ground and the received video can be transmitted through the plurality of wireless devices on the vehicle to the wireless device connected to the video display. This causes, however, wireless bandwidth overload in the plurality of wireless devices on the vehicle.

Japanese Patent No. 6669041 discloses a method of allocating D2D communication resources, but does not disclose a method of reducing the overload of wireless bandwidth. Therefore, it is required to reduce the overload of wireless bandwidth in a plurality of wireless devices on the vehicle in ground-vehicle communication based on ProSe.

SUMMARY OF THE INVENTION

To solve the problem described above, a wireless system according to the present disclosure includes: a wireless device installed on a ground along a track; and a plurality of wireless devices installed on a train in a line from a head side to a rear side of the train. When the wireless device installed on the ground and the plurality of wireless devices installed on the train perform communication using proximity service, a limitation is placed such that only one of the plurality of wireless devices is connected to the wireless device installed on the ground. Among the plurality of wireless devices installed on the train, the wireless device installed not at a head in a traveling direction of the train makes, upon detecting the wireless device installed on the ground, an inquiry about connection permission with the wireless device installed on the ground to the wireless device installed at the head in the traveling direction of the train among the plurality of wireless devices. Upon receiving the inquiry about connection permission with the wireless device installed on the ground from the wireless device installed not at the head, the wireless device installed at the head in the traveling direction of the train gives connection permission to the wireless device installed at a position closest to the head in the traveling direction of the train among one or more wireless devices that have made the inquiry. Among the plurality of wireless devices installed on the train, the wireless device that has received the connection permission communicates with the wireless device installed on the ground.

DETAILED DESCRIPTION OF THE PREFERRED EMBODIMENTS

Hereinafter, a wireless system and a ground-vehicle transmission method according to embodiments will be described in detail with reference to the drawings.

First Embodiment

Figure 1:
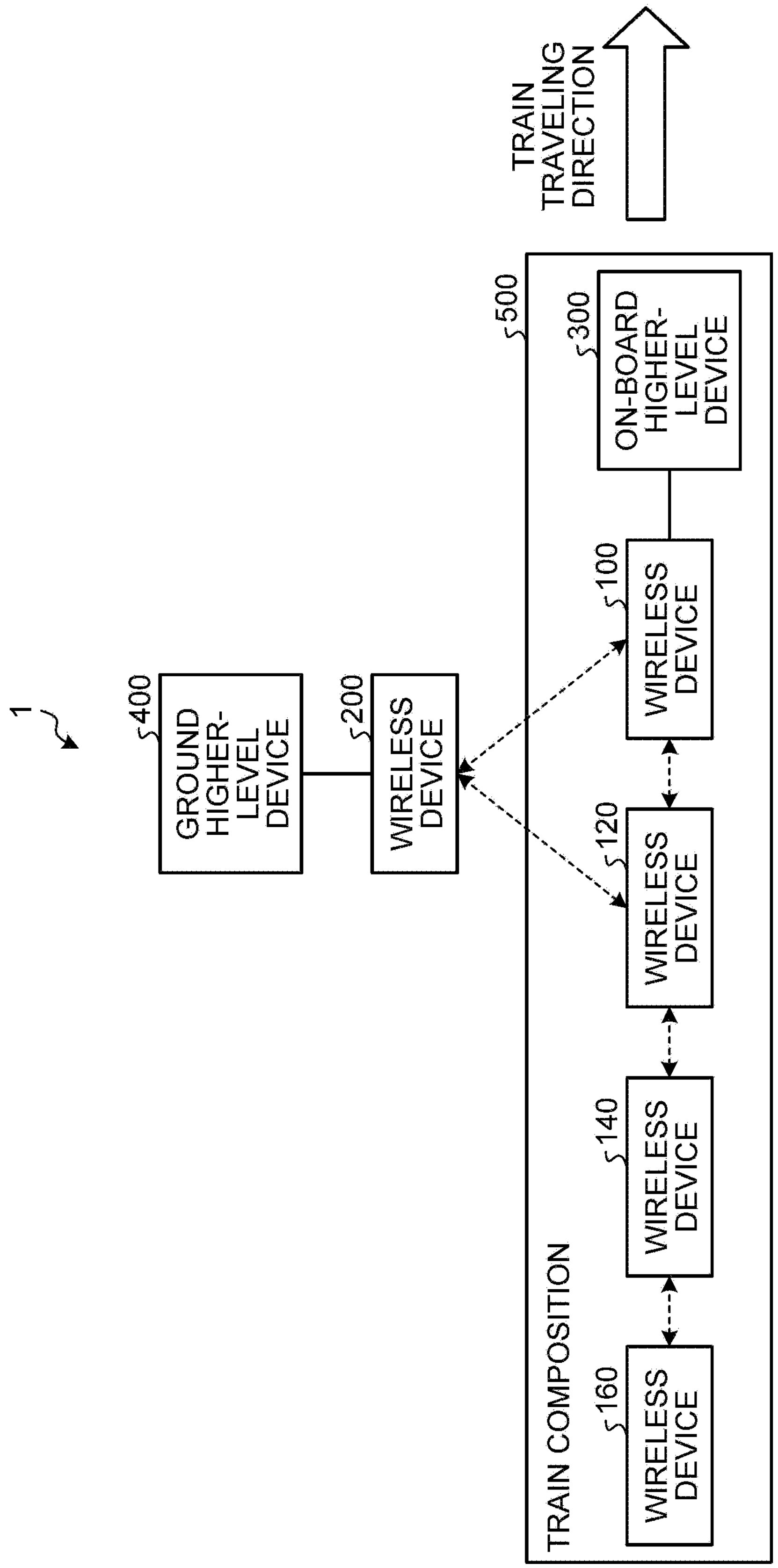
FIG. 1 is a diagram illustrating a configuration of a Train to Train or Train to Infrastructure (T2X) system according to a first embodiment.

FIG. 1 is a diagram illustrating a configuration of a T2X system 1 according to a first embodiment. The T2X system 1 is a wireless system including a wireless device 200 installed on the ground along a track, and a plurality of wireless devices 100, 120, 140, and 160 installed on a train composition 500. The plurality of wireless devices 100, 120, 140, and 160 are installed in a line from the head side to the rear side of the train composition 500.

The wireless device 200 installed on the ground transmits data to the train composition 500. An application example of the T2X system 1 can be a track monitoring system that transmits a ground monitoring camera video to a vehicle and displays the video on a video display on the vehicle. When the wireless device 200 installed on the ground and the plurality of wireless devices 100, 120, 140, and 160 installed on the train composition 500 perform communication using proximity service, the T2X system 1 places a limitation such that only one of the plurality of wireless devices 100, 120, 140, and 160 is connected to the wireless device 200 installed on the ground.

An on-board higher-level device 300 is connected to the wireless device 100. The on-board higher-level device 300 is included in the train composition 500. The wireless device 100, the wireless device 120, the wireless device 140, and the wireless device 160 are disposed on the train composition 500 in a line from the head side to the rear side in the traveling direction of the train composition 500 in this order. Each of the wireless device 100, the wireless device 120, the wireless device 140, and the wireless device 160 communicates with an adjacent wireless device by ProSe unicast. That is, ProSe unicast communication is performed between the wireless device 100 and the wireless device 120, between the wireless device 120 and the wireless device 140, and between the wireless device 140 and the wireless device 160.

The train composition 500 travels in the direction from the wireless device 160 to the wireless device 100, i.e. in the right direction in FIG. 1. A ground higher-level device 400 is connected to the wireless device 200. The wireless device 200 communicates with the wireless devices 100, 120, 140, and 160 disposed on the train composition 500 by ProSe layer 2 groupcast. Although FIG. 1 shows that the four wireless devices 100, 120, 140, and 160 are installed on the train composition 500, the number of wireless devices disposed on the train composition 500 only needs to be two or more. Although FIG. 1 shows that the wireless device 200 communicates with the wireless device 100 and the wireless device 120, the wireless device 200 can communicate with any wireless devices disposed on the train composition 500 within its communicable range.

Figure 2:
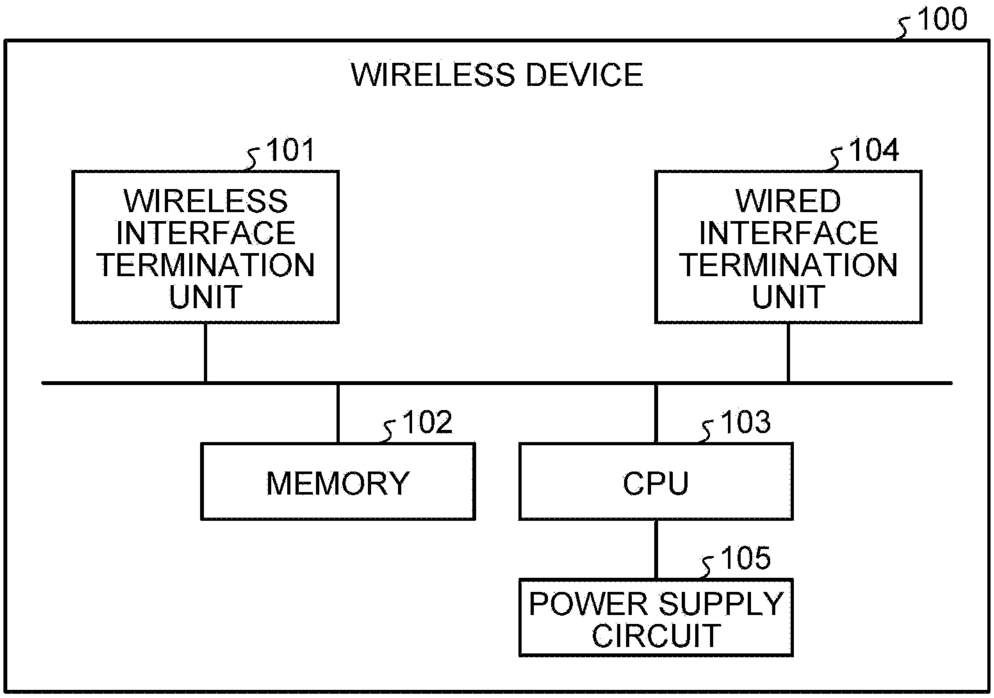
FIG. 2 is a diagram illustrating a hardware configuration of a wireless device included in the T2X system according to the first embodiment.

FIG. 2 is a diagram illustrating a hardware configuration of the wireless device 100 included in the T2X system 1 according to the first embodiment. The wireless device 100 includes a wireless interface termination unit 101, a memory 102, a central processing unit (CPU) 103, a wired interface termination unit 104, and a power supply circuit 105. The memory 102 is, for example, a semiconductor memory.

Figure 3:
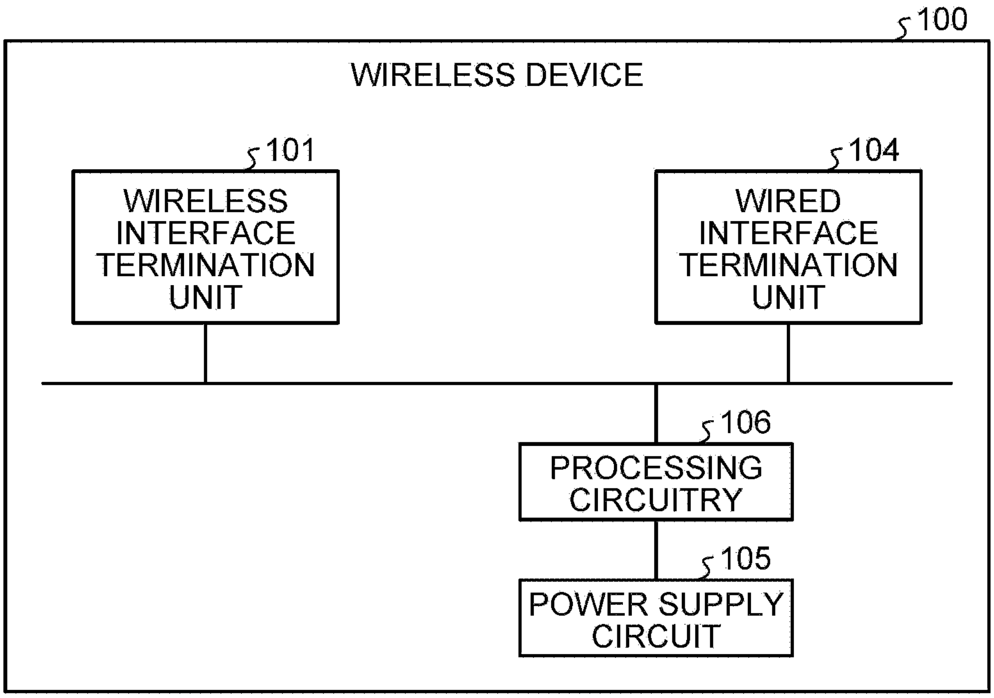
FIG. 3 is a diagram illustrating a hardware configuration of another form of the wireless device included in the T2X system according to the first embodiment.

FIG. 3 is a diagram illustrating a hardware configuration of another form of the wireless device 100 included in the T2X system 1 according to the first embodiment. The wireless device 100 in FIG. 3 is different from the wireless device 100 in FIG. 2 in that the memory 102 and the CPU 103 included in the wireless device 100 in FIG. 2 are replaced with processing circuitry 106 in the wireless device 100 in FIG. 3. The configuration of the wireless device 100 may be either the configuration in FIG. 2 or the configuration in FIG. 3.

Figure 4:
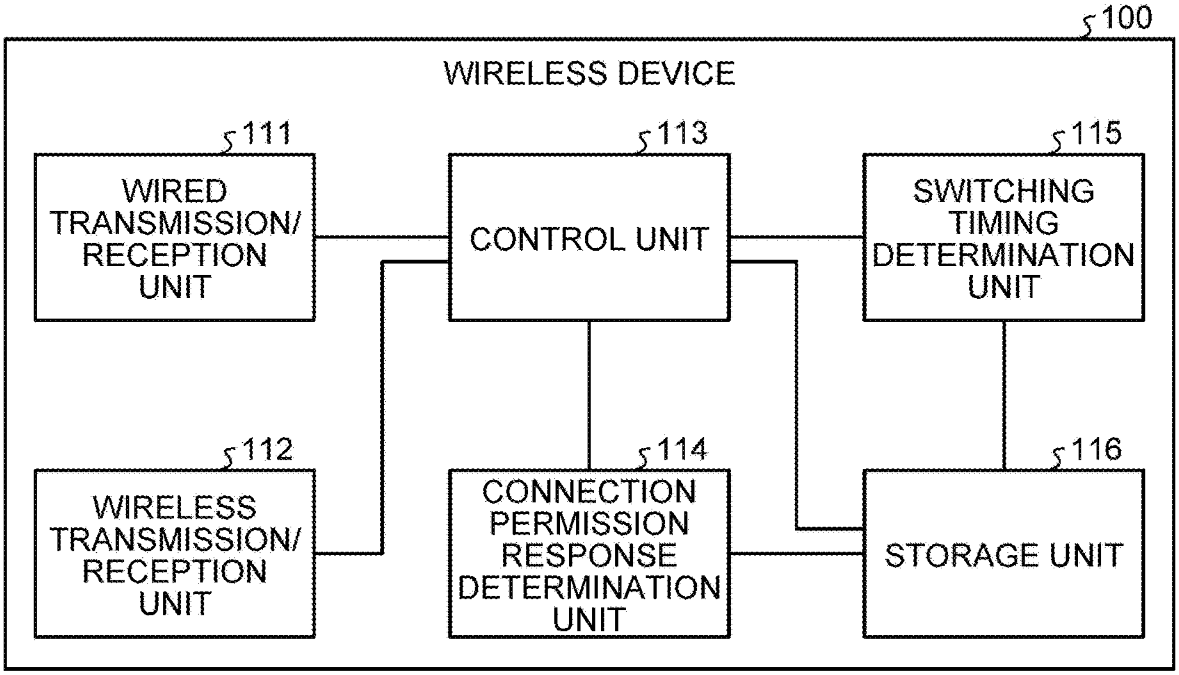
FIG. 4 is a diagram illustrating a functional configuration of the wireless device included in the T2X system according to the first embodiment.

FIG. 4 is a diagram illustrating a functional configuration of the wireless device 100 included in the T2X system 1 according to the first embodiment. The wireless device 100 includes a wired transmission/reception unit 111 that performs a wired communication data transmission/reception procedure, and a wireless transmission/reception unit 112 that performs a wireless communication data transmission/reception procedure and scheduling of a wireless communication timing. The wireless device 100 further includes a control unit 113 that performs setting of a ProSe Layer-2 group identifier (ID), processing of transmission/reception messages, and reference of information held in the memory, and a connection permission response determination unit 114 that performs response and determination of connection permission with the wireless device 200 installed on the ground.

The wireless device 100 further includes a switching timing determination unit 115 that determines a function shift timing regarding the response and determination of connection permission, and a storage unit 116 that holds the ProSe Layer-2 Group ID of the wireless device 100, information on the wireless device that has made an inquiry about connection permission, information indicating whether the wireless device 100 is the head wireless device, information indicating the distance between wireless devices on the train composition 500, and information indicating the specified traveling speed at the installation place of the wireless device 200 on the ground.

The functions of the wired transmission/reception unit 111, the wireless transmission/reception unit 112, the control unit 113, the connection permission response determination unit 114, and the switching timing determination unit 115 may be implemented by a CPU that executes a program or may be implemented by a dedicated circuit. In a case where a CPU implements the above functions, the wireless device 100 includes the memory 102 and the CPU 103 illustrated in FIG. 2. Information for implementing the functions of the wired transmission/reception unit 111, the wireless transmission/reception unit 112, the control unit 113, the connection permission response determination unit 114, and the switching timing determination unit 115 is described as a program and stored in the memory 102. The CPU 103 reads and executes the program stored in the memory 102 to implement the functions of the wired transmission/reception unit 111, the wireless transmission/reception unit 112, the control unit 113, the connection permission response determination unit 114, and the switching timing determination unit 115.

In a case where a dedicated circuit implements the above-described functions, the wireless device 100 includes the processing circuitry 106 illustrated in FIG. 3, and the processing circuitry 106 implements the functions of the wired transmission/reception unit 111, the wireless transmission/reception unit 112, the control unit 113, the connection permission response determination unit 114, and the switching timing determination unit 115. Some of the functions of the wired transmission/reception unit 111, the wireless transmission/reception unit 112, the control unit 113, the connection permission response determination unit 114, and the switching timing determination unit 115 may be implemented by a dedicated circuit, and the rest of the functions may be implemented by a program and a CPU.

The configuration of each of the wireless device 120, the wireless device 140, the wireless device 160, and the wireless device 200 is the same as the configuration of the wireless device 100.

Figure 5:
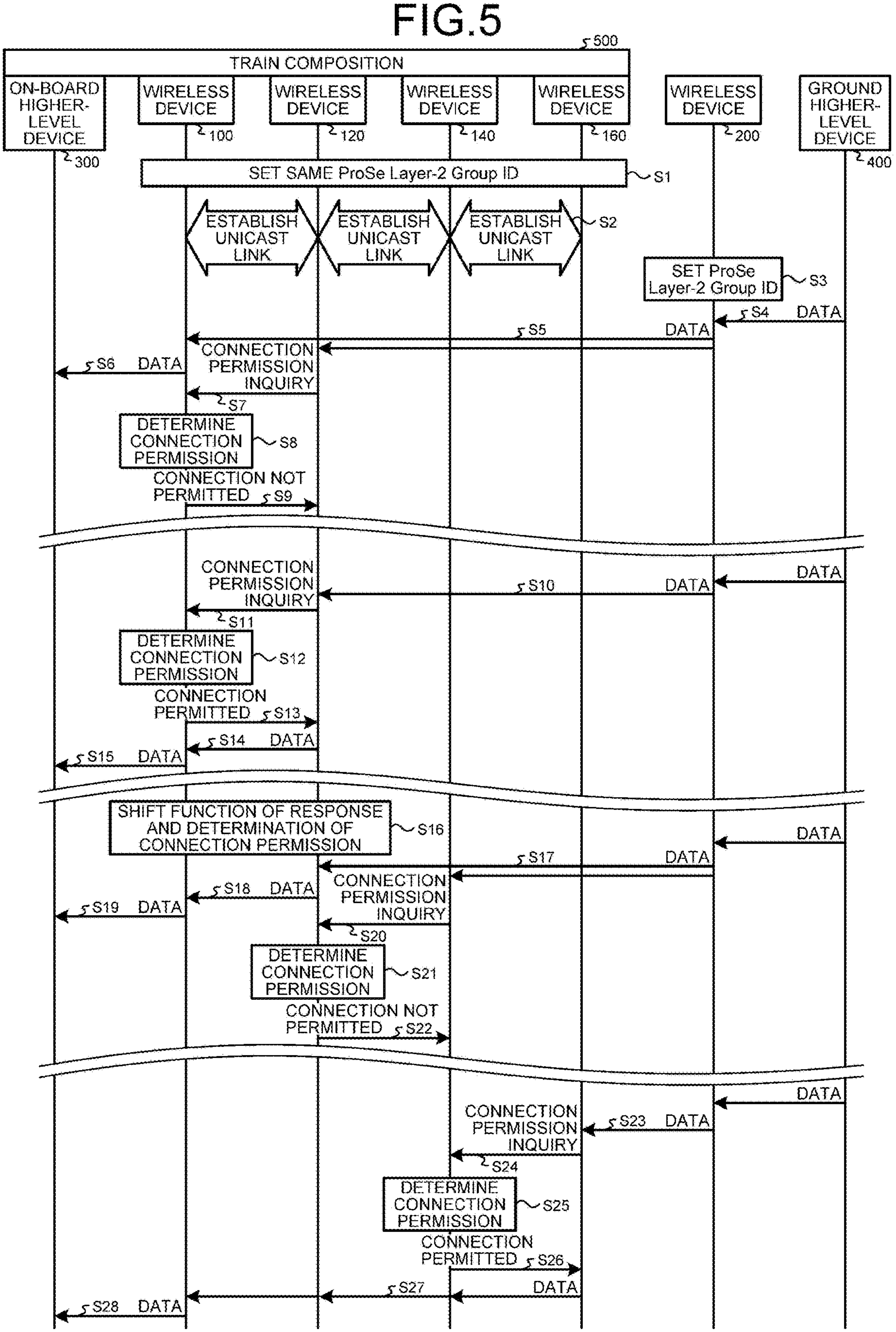
FIG. 5 is a sequence diagram illustrating a procedure for operation in ground-vehicle communication in the T2X system according to the first embodiment.
Figure 6:
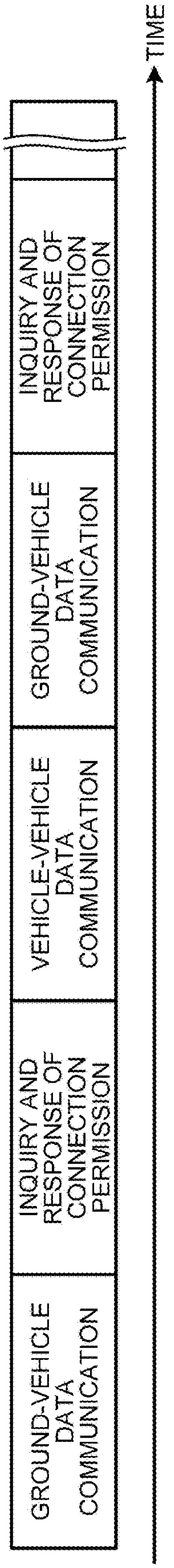
FIG. 6 is a diagram illustrating wireless communication scheduling according to the first embodiment.

FIG. 5 is a sequence diagram illustrating a procedure for operation in ground-vehicle communication in the T2X system 1 according to the first embodiment. FIG. 6 is a diagram illustrating wireless communication scheduling according to the first embodiment. In the T2X system 1, the wireless device 200 installed on the ground and the plurality of wireless devices 100, 120, 140, and 160 installed on the train composition 500 perform data communication and inquiry about connection permission at different timings using the scheduling of proximity service. That is, in the T2X system 1, ground-vehicle data communication, inquiry and response of connection permission, and vehicle-vehicle data communication are performed at different timings using the scheduling of ProSe, whereby the congestion of messages and data is reduced.

The schedule illustrated in FIG. 6 shows that ground-vehicle data communication, inquiry and response of connection permission, and vehicle-vehicle data communication are scheduled in this order. However, ground-vehicle data communication, inquiry and response of connection permission, and vehicle-vehicle data communication may be performed in an order different from the order illustrated in FIG. 6. Each communication time may be any communication time.

Next, the operation of the T2X system 1 will be described with reference to FIG. 5, in which ground-vehicle communication is performed while allowing only one on-board wireless device to perform ground-vehicle communication so as to avoid wireless bandwidth overload between the on-board wireless devices.

The wireless device 100, the wireless device 120, the wireless device 140, and the wireless device 160 set, at the control unit 113, the same ProSe Layer-2 Group ID held in the storage unit 116 (S1). The wireless transmission/reception units 112 of adjacent wireless devices perform a data transmission/reception procedure to establish a unicast link (S2). Adjacent wireless devices are the wireless device 100 and the wireless device 120, the wireless device 120 and the wireless device 140, and the wireless device 140 and the wireless device 160.

The wireless device 200 sets, at the control unit 113, a ProSe Layer-2 Group ID similar to the ID of the on-board wireless devices held in the storage unit 116 (S3). The ground higher-level device 400 transmits data to the wireless device 200, and the wireless device 200 receives at the wired transmission/reception unit 111 the data transmitted by the ground higher-level device 400 (S4). The wireless device 200 performs a data transmission procedure at the wireless transmission/reception unit 112 to transfer the data by groupcast (S5).

As the train composition 500 approaches the installation place of the wireless device 200, the wireless device 100 receives at the wireless transmission/reception unit 112 the data transmitted by the wireless device 200, and transfers the data to the on-board higher-level device 300 through the wired transmission/reception unit 111 (S6). Upon receiving the data at the wireless transmission/reception unit 112, the wireless device 120 refers at the control unit 113 to the information held in the storage unit 116 and indicating whether the wireless device 120 is a wireless device installed at the head, and upon confirming that the wireless device 120 is a wireless device not at the head, transmits a connection permission inquiry message to the wireless device 100 through the wireless transmission/reception unit 112 (S7).

The wireless device 100 receives the connection permission inquiry message at the wireless transmission/reception unit 112, and the control unit 113 in the wireless device 100 requests the connection permission response determination unit 114 to determine the connection permission. The connection permission response determination unit 114 refers to the information, held in the storage unit 116, on the wireless device that has made the inquiry about connection permission, and determines whether to permit the connection (S8). Specifically, because the wireless device 100 has received the inquiry about connection permission from the wireless device 120, the connection permission response determination unit 114 of the wireless device 100 determines not to permit the connection in step S8.

In the wireless device 100, the connection permission response determination unit 114 generates a notification message that the connection is not permitted, the control unit 113 passes the notification message that the connection is not permitted to the wireless transmission/reception unit 112, and the wireless transmission/reception unit 112 notifies the wireless device 120 that the connection is not permitted (S9).

After the operation in step S9 is performed, the wireless device 200 transmits data to the train composition 500 (S10). Once the wireless device 100 becomes unable to receive data from the wireless device 200 due to the movement of the train composition 500, the wireless device 120 that has received the data transmitted by the wireless device 200 makes an inquiry about connection permission to the wireless device 100 (S11). The wireless device 100 that has received the inquiry about connection permission refers to the data held in the storage unit 116 at the connection permission response determination unit 114, confirms that the wireless device 100 has not received data from the wireless device 200 and that the wireless device 120 is a wireless device installed at a position closest to the head among the wireless devices that have made the inquiry about connection permission, and determines to permit the connection (S12).

In the wireless device 100, the connection permission response determination unit 114 generates a notification message that the connection is permitted, the control unit 113 passes the notification message that the connection is permitted to the wireless transmission/reception unit 112, and the wireless transmission/reception unit 112 notifies the wireless device 120 that the connection is permitted (S13). Upon receiving the notification of connection permission at the wireless transmission/reception unit 112, the wireless device 120 transfers the data received from the wireless device 200 to the wireless device 100 by unicast using the wireless transmission/reception unit 112 (S14). The wireless device 100 transfers the data to the on-board higher-level device 300 through the wired transmission/reception unit 111 (S15).

The function that the wireless device 100 implements at the connection permission response determination unit 114 shifts to the subsequent wireless device 120 in accordance with the movement of the train composition 500 (S16). The function is the function of determining connection permission and responding to connection permission. The function shifts to the subsequent wireless device each time the time calculated from the moving speed of the train composition 500, the acceleration of the train composition 500, and the distance between the wireless device 100 and the wireless device 120 or the time calculated from the specified traveling speed at the installation place of the wireless device 200 on the ground and the distance between the wireless device 100 and the wireless device 120 elapses.

Note that the time calculation is performed by the switching timing determination unit 115. The switching timing determination unit 115 refers to the information held in the storage unit 116 for the distance between the wireless device 100 and the wireless device 120 and the specified traveling speed at the installation place of the wireless device 200.

Information indicating the moving speed and acceleration of the train composition 500 is acquired by the switching timing determination unit 115. The starting point of the time of the shift timing is a timing at which the wireless device 100 first receives data. Information indicating the starting point timing is transmitted from the wireless transmission/reception unit 112 to the wireless device 120 at the time of response to the inquiry about connection permission.

After the function of the response and determination of connection permission is shifted from the wireless device 100 to the wireless device 120 in step S16, the wireless device 120 can receive data from the wireless device 200 (S17), in which case the wireless device 120 does not make an inquiry about connection permission, and transfers the data to the wireless device 100 by unicast through the wireless transmission/reception unit 112 (S18). The wireless device 100 transfers the data to the on-board higher-level device 300 through the wired transmission/reception unit 111 (S19).

Upon receiving the data transmitted by the wireless device 200 at the wireless transmission/reception unit 112, the wireless device 140 makes an inquiry about connection permission to the wireless device 120 using an operation similar to the operation in step S7 (S20). The wireless device 120 performs the determination of connection permission and the notification of non-permission to the wireless device 140 using operations similar to the operations in steps S8 and S9 (S21, S22).

The train composition 500 further moves after the operation of step S22 is performed, and then operations similar to the above-described operations are performed. For example, when the wireless device 140 has the function of response and determination of connection permission and the wireless device 160 receives the transmission data of the wireless device 200 (S23), the wireless device 160 makes an inquiry about connection permission to the wireless device 140 using an operation similar to the operation in step S11 (S24), and the wireless device 140 determines the connection permission and notifies the wireless device 160 of the connection permission using operations similar to the operations in steps S12 and S13 (S25, S26).

The wireless device 160 transmits the data received from the wireless device 200 at the wireless transmission/reception unit 112 to the wireless device 140 by unicast. The wireless device 140 transmits the data to the wireless device 120 by unicast. The wireless device 120 transmits the data to the wireless device 100 by unicast (S27). The wireless device 100 transfers the data to the on-board higher-level device 300 through the wired transmission/reception unit 111 (S28).

As described above, when the wireless device 200 installed on the ground and the plurality of wireless devices 100, 120, 140, and 160 installed on the train composition 500 perform communication using proximity service, the T2X system 1 according to the first embodiment places a limitation such that only one of the plurality of wireless devices 100, 120, 140, and 160 is connected to the wireless device 200 installed on the ground. As a result, the T2X system 1 can cause the plurality of wireless devices 100, 120, 140, and 160 installed on the train composition 500 to transmit data while reducing the overload of wireless bandwidth. Consequently, the T2X system 1 can allow the operator of the train composition 500 to efficiently conduct the work of monitoring obstacles on the track.

As described above, the T2X system 1 first places a limitation such that among the plurality of wireless devices 100, 120, 140, and 160 installed on the train composition 500, only the wireless device 100 installed at the head in the traveling direction of the train composition 500 is allowed to communicate with the wireless device 200 installed on the ground. As a result, the overload of wireless bandwidth can be reduced in the plurality of wireless devices 100, 120, 140, and 160.

As described above, in the T2X system 1, among the plurality of wireless devices 100, 120, 140, and 160 installed on the train composition 500, the wireless devices 120, 140, and 160 installed not at the head in the traveling direction of the train composition 500 make, upon detecting the wireless device 200 installed on the ground, an inquiry about connection permission with the wireless device 200 installed on the ground to the wireless device 100 installed at the head in the traveling direction of the train composition 500 among the plurality of wireless devices 100, 120, 140, and 160. Upon receiving the inquiry about connection permission with the wireless device 200 installed on the ground from the wireless device installed not at the head, the wireless device 100 installed at the head in the traveling direction of the train composition 500 gives connection permission to the wireless device installed at a position closest to the head in the traveling direction of the train composition 500 among one or more wireless devices that have made the inquiry. Among the plurality of wireless devices 120, 140, and 160 installed on the train composition 500, the wireless device that has received the connection permission communicates with the wireless device 200 installed on the ground. As a result, the overload of wireless bandwidth can be reduced in the plurality of wireless devices 100, 120, 140, and 160.

In the T2X system 1, the function in which one wireless device of the plurality of wireless devices 100, 120, 140, and 160 installed on the train composition 500 receives an inquiry about connection permission with the wireless device 200 installed on the ground from some wireless device other than the one wireless device of the plurality of wireless devices 100, 120, 140, and 160, and then the one wireless device gives connection permission to the wireless device installed at a position closest to the head in the traveling direction of the train composition 500 among one or more wireless devices that have made the inquiry shifts to subsequent wireless devices in order from the wireless device installed at the head in the traveling direction of the train composition 500 among the plurality of wireless devices 100, 120, 140, and 160 installed on the train composition 500 at the following timing in accordance with the movement of the train composition 500. The timing is a timing calculated from the speed of the train composition 500, the acceleration of the train composition 500, and the distance between adjacent wireless devices of the plurality of wireless devices 100, 120, 140, and 160 installed on the train composition 500, or a timing calculated from the specified traveling speed at the installation place of the wireless device 200 installed on the ground and the installation position of the plurality of wireless devices 100, 120, 140, and 160 installed on the train composition 500.

In the T2X system 1, a first wireless device among the plurality of wireless devices 100, 120, 140, and 160 installed on the train composition 500 notifies a second wireless device among the plurality of wireless devices 100, 120, 140, and 160 of information necessary for performing link establishment and security authentication with the wireless device 200 installed on the ground. As a result, at least a part of the procedure for the second wireless device to perform link establishment and security authentication can be omitted. In accordance with the movement of the train composition 500, at a timing calculated from the speed of the train composition 500, the acceleration of the train composition 500, and the distance between adjacent wireless devices of the plurality of wireless devices 100, 120, 140, and 160 installed on the train composition 500, or a timing calculated from the specified traveling speed at the installation place of the wireless device 200 installed on the ground and the installation position of the plurality of wireless devices 100, 120, 140, and 160 installed on the train composition 500, the wireless device that communicates with the wireless device 200 installed on the ground is switched among the plurality of wireless devices 100, 120, 140, and 160 installed on the train composition 500.

Second Embodiment

In the first embodiment, data is transmitted by ProSe groupcast between the wireless device 200 on the ground and the wireless devices 100, 120, 140, and 160 installed on the train composition 500. In the second embodiment, data is transmitted by ProSe unicast between the wireless device 200 on the ground and the wireless devices 100, 120, 140, and 160 installed on the train composition 500. In the second embodiment, differences from the first embodiment will be mainly described.

Figure 7:
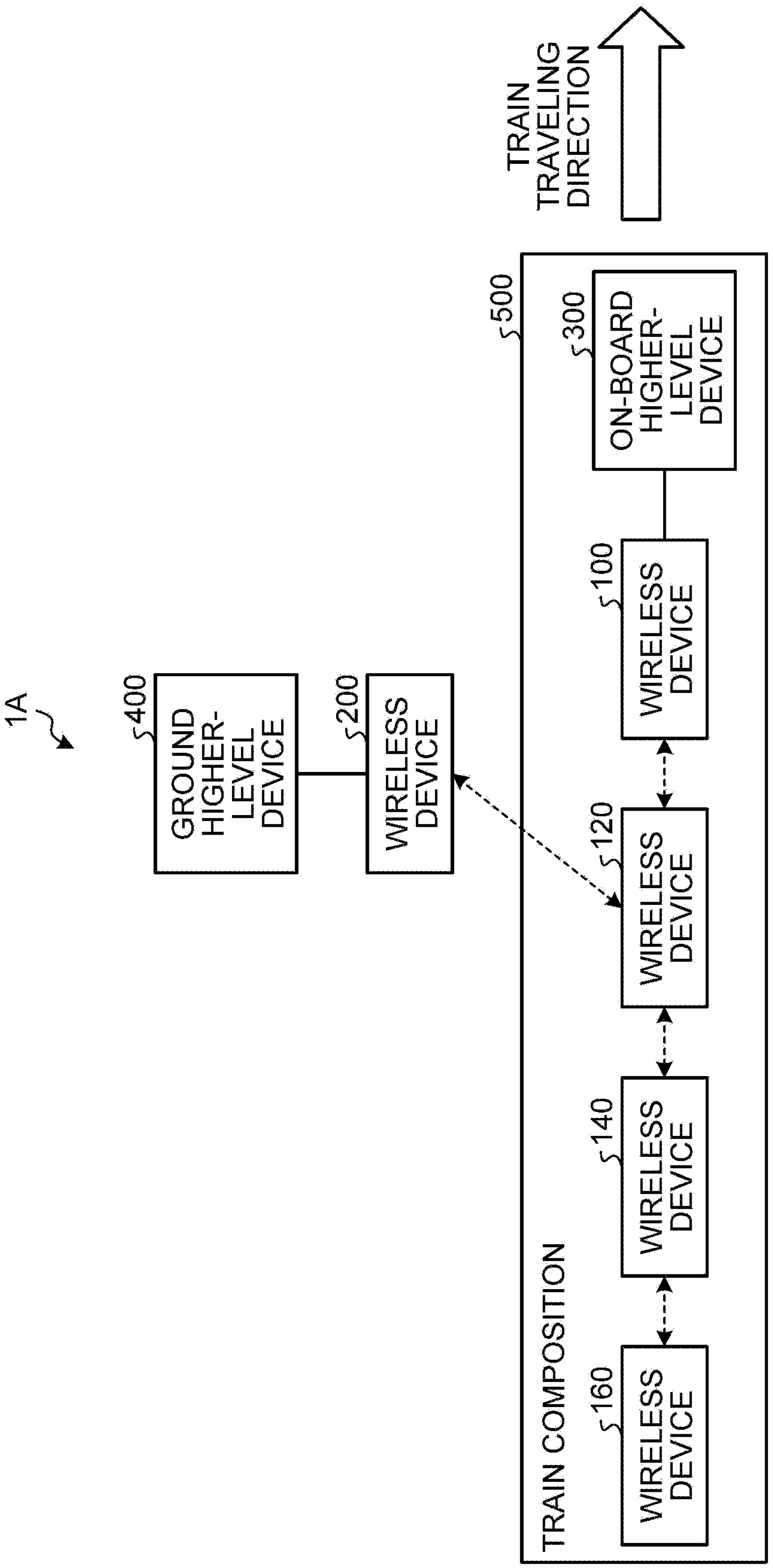
FIG. 7 is a diagram illustrating a configuration of a T2X system according to a second embodiment.

FIG. 7 is a diagram illustrating a configuration of a T2X system 1A according to the second embodiment. The wireless device 100, the wireless device 120, the wireless device 140, and the wireless device 160 have the same ProSe User Equipment (UE) ID, and belong to the same ProSe Layer-2 Group. As described above, the wireless device 200 communicates with the wireless device 100, the wireless device 120, the wireless device 140, and the wireless device 160 installed on the train composition 500 by ProSe unicast.

Although FIG. 7 shows that the four wireless devices 100, 120, 140, and 160 are installed on the train composition 500, the number of wireless devices disposed on the train composition 500 only needs to be two or more. Although FIG. 7 shows that the wireless device 200 communicates with the wireless device 120, the wireless device 200 can communicate with any wireless devices disposed on the train composition 500 within its communicable range.

Figure 8:
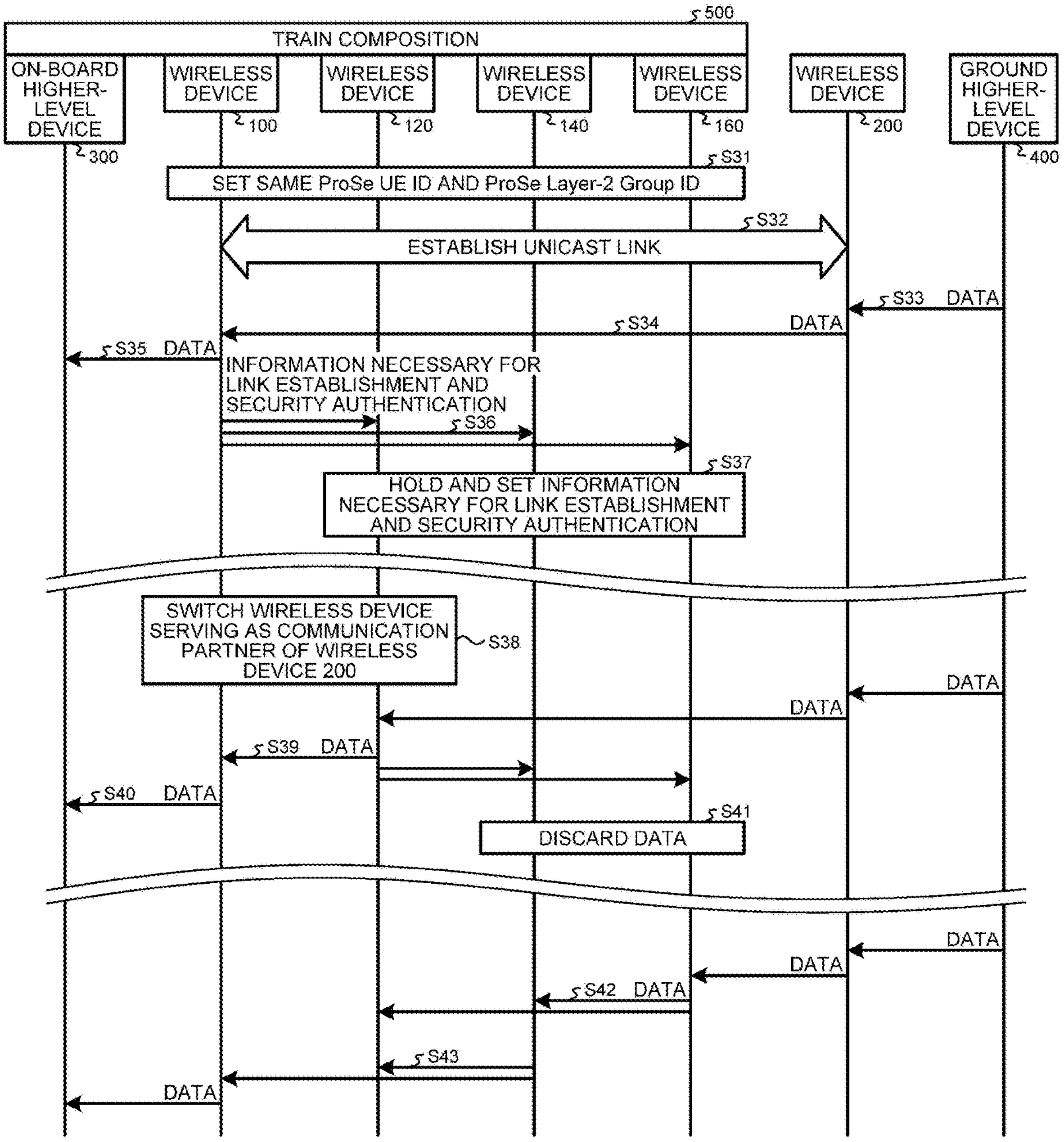
FIG. 8 is a sequence diagram illustrating a procedure for operation in ground-vehicle communication in the T2X system according to the second embodiment.

FIG. 8 is a sequence diagram illustrating a procedure for operation in ground-vehicle communication in the T2X system 1A according to the second embodiment. In the second embodiment, as described above, data is transmitted by unicast. The operation of the T2X system 1A will be described with reference to FIG. 8, in which ground-vehicle communication is performed while allowing only one on-board wireless device to perform ground-vehicle communication so as to avoid wireless bandwidth overload between the on-board wireless devices.

The wireless device 100, the wireless device 120, the wireless device 140, and the wireless device 160 installed on the train composition 500 set, at the control unit 113, the same ProSe UE ID and ProSe Layer-2 Group ID held in the storage unit 116 (S31). As the train composition 500 approaches the place where the wireless device 200 is installed, the wireless device 100 and the wireless device 200 transmit and receive a message for establishing a ProSe unicast link through the wireless transmission/reception unit 112, and establish the unicast link (S32).

The wireless device 200 receives data from the ground higher-level device 400 at the wired transmission/reception unit 111 (S33), and transmits the data to the wireless device 100 through the wireless transmission/reception unit 112. The wireless device 100 receives the data from the wireless device 200 at the wireless transmission/reception unit 112 (S34). The wireless device 100 transmits the received data to the on-board higher-level device 300 through the wired transmission/reception unit 111 (S35).

After establishing the unicast link with the wireless device 200, the wireless device 100 holds information necessary for link establishment and security authentication in the storage unit 116, and further transmits the information to the wireless device 120, the wireless device 140, and the wireless device 160 by ProSe groupcast through the wireless transmission/reception unit 112 (S36). The information necessary for link establishment and security authentication is ProSe UE ID, ProSe Layer-2 Group ID, Application Layer ID, and security information.

At this time, the wireless devices installed on the train composition 500 that are not the tail wireless device 160, that is, the wireless device 120 and the wireless device 140, further transmit the link establishment information received from the wireless device on the head side thereof by ProSe groupcast. This enables all the wireless devices 100, 120, 140, and 160 on the train composition 500 to acquire the information necessary for link establishment and security authentication. The wireless device 120, the wireless device 140, and the wireless device 160 set the information necessary for link establishment and security authentication received at the wireless transmission/reception unit 112 for themselves at the control unit 113, and hold the information in the storage unit 116 (S37).

In accordance with the movement of the train composition 500, the wireless device serving as the communication partner of the wireless device 200 is switched at the timing calculated by the switching timing determination unit 115 (S38). The communication partner is switched to the subsequent wireless device each time the time calculated from the moving speed of the train composition 500, the acceleration of the train composition 500, and the distance between wireless devices on the train composition 500 or the time calculated from the specified traveling speed at the installation place of the wireless device 200 on the ground and the distance between wireless devices regarding the plurality of wireless devices 100, 120, 140, and 160 installed on the train composition 500 elapses.

The switching timing determination unit 115 refers to the information held in the storage unit 116 for the above-described distance between wireless devices and the specified traveling speed at the installation place of the wireless device 200, and the information indicating the moving speed and acceleration of the train composition 500 is acquired by the switching timing determination unit 115. The starting point of the time of the shift timing is a timing at which the wireless device 100 first receives data, and information indicating the starting point timing is transmitted by ProSe groupcast together when the information necessary for link establishment and security authentication is transmitted.

After the communication partner of the wireless device 200 is switched to the wireless device 120, the wireless device 120 transmits the data from the wireless device 200 received at the wireless transmission/reception unit 112 to the wireless device 100 by ProSe groupcast (S39). The wireless device 100 transmits the received data to the on-board higher-level device 300 (S40). When the wireless device 120 transmits data to the wireless device 100 by ProSe groupcast, the wireless device 140 and the wireless device 160 may receive data. However, the wireless device 140 and the wireless device 160 that have received data from a wireless device installed on the head side thereof discard the received data (S41).

When the wireless device 140 receives data from the wireless device 160 on the rear side thereof by ProSe groupcast (S42), the wireless device 140 retransmits the data by ProSe groupcast (S43). Consequently, the data is transmitted to the head wireless device 100. Note that information indicating the order of the wireless devices 100, 120, 140, and 160 installed on the train composition 500 is held in the storage unit 116, and the control unit 113 refers to the information and determines whether to discard the data and whether to retransmit the received data.

The effect obtained in the second embodiment is the same as the effect obtained in the first embodiment.

Third Embodiment

In the first and second embodiments, data is transmitted from the ground to the vehicle. In the third embodiment, data is transmitted from a wireless device on the vehicle to a wireless device on the ground by groupcast.

Figure 9:
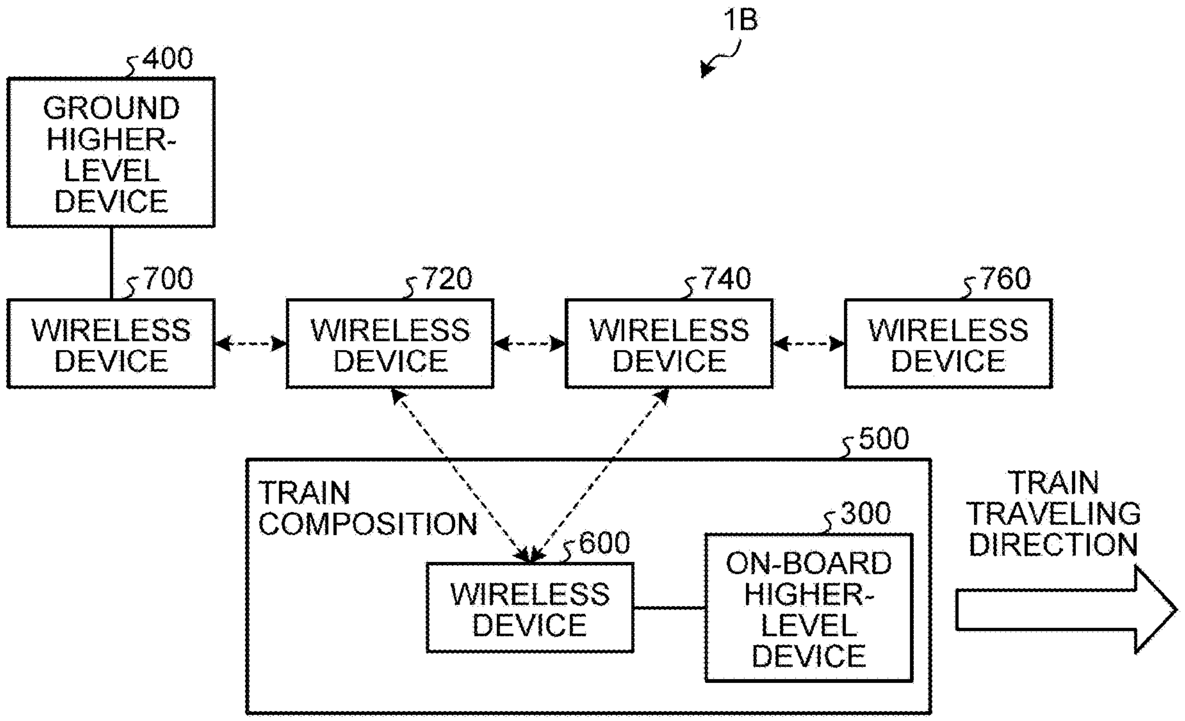
FIG. 9 is a diagram illustrating a configuration of a T2X system according to a third embodiment.

FIG. 9 is a diagram illustrating a configuration of a T2X system 1B according to the third embodiment. The T2X system 1B is a wireless system including a plurality of wireless devices 700, 720, 740, and 760 installed on the ground in a line along a track, and a wireless device 600 installed on the train composition 500. The configuration of each of the wireless device 600, the wireless device 700, the wireless device 720, the wireless device 740, and the wireless device 760 is the same as the configuration of the wireless device 100 in the first embodiment.

In the third embodiment, the wireless device 600 installed on the train composition 500 transmits data to the plurality of wireless devices 700, 720, 740, and 760 installed on the ground. An application example of the T2X system 1B can be a travel log collection system in which a traveling train transmits the travel log of the train to, for example, a wireless device installed at a rail yard entrance on a detention line. In the third embodiment, differences from the first embodiment will be mainly described.

When the plurality of wireless devices 700, 720, 740, and 760 installed on the ground and the wireless device 600 installed on the train composition 500 perform communication using proximity service, the T2X system 1B places a limitation such that only one of the plurality of wireless devices 700, 720, 740, and 760 installed on the ground is connected to the wireless device 600 installed on the train composition 500.

The ground higher-level device 400 is connected to the wireless device 700. The wireless device 700, the wireless device 720, the wireless device 740, and the wireless device 760 are disposed in this order from the rear side in the traveling direction of the train along the track. Each of the wireless device 700, the wireless device 720, the wireless device 740, and the wireless device 760 communicates with an adjacent wireless device by ProSe unicast. Adjacent wireless devices are the wireless device 700 and the wireless device 720, the wireless device 720 and the wireless device 740, and the wireless device 740 and the wireless device 760.

The wireless device 600 is connected to the on-board higher-level device 300. The wireless device 600 communicates with the wireless devices 700, 720, 740, and 760 on the ground by ProSe layer 2 groupcast. Although FIG. 9 shows that the four wireless devices 700, 720, 740, and 760 are installed on the ground, the number of wireless devices installed on the ground only needs to be two or more. Although FIG. 9 shows that the wireless device 600 communicates with the wireless device 720 and the wireless device 740, the wireless device 600 can communicate with any wireless devices on the ground within its communicable range.

The operation of each device in the third embodiment is similar to the operation of each device in the first embodiment illustrated in FIG. 5, except that the wireless device 200 is replaced with the wireless device 600, the wireless device 100 is replaced with the wireless device 700, the wireless device 120 is replaced with the wireless device 720, the wireless device 140 is replaced with the wireless device 740, the wireless device 160 is replaced with the wireless device 760, the ground higher-level device 400 is replaced with the on-board higher-level device 300, and the on-board higher-level device 300 is replaced with the ground higher-level device 400.

The T2X system 1B according to the third embodiment places a limitation such that only one wireless device on the ground communicates with the on-board wireless device 600 in ground-vehicle communication using ProSe, so that the plurality of wireless devices 700, 720, 740, and 760 on the ground can transmit data without wireless bandwidth overload. As a result, the T2X system 1B can shorten the transmission time for transmitting the travel log of the train composition 500 to, for example, a wireless device installed at a rail yard entrance on a detention line while the train composition 500 is traveling.

As described above, the T2X system 1B according to the third embodiment is a system in which the wireless device 200 in the first embodiment is replaced with the wireless device 600, and the wireless device 100, the wireless device 120, the wireless device 140, and the wireless device 160 in the first embodiment are replaced with the wireless device 700, the wireless device 720, the wireless device 740, and the wireless device 760. That is, the T2X system 1B first places a limitation such that among the plurality of wireless devices 700, 720, 740, and 760 installed on the ground, only the wireless device 700 installed at the rearmost in the traveling direction of the train composition 500 and that the train composition 500 approaches first is allowed to communicate with the wireless device 600 installed on the train composition 500.

Among the plurality of wireless devices 700, 720, 740, and 760 installed on the ground, the wireless devices 720, 740, and 760 different from the wireless device 700 that the train composition 500 approaches first make, upon detecting the wireless device 600 installed on the train composition 500, an inquiry about connection permission with the wireless device 600 installed on the train composition 500 to the wireless device 700 that the train composition 500 approaches first. Upon receiving the inquiry about connection permission with the wireless device 600 installed on the train composition 500 from the wireless device different from the wireless device 700 that the train composition 500 approaches first, the wireless device 700 that the train composition 500 approaches first gives connection permission to the wireless device at the rearmost in the traveling direction of the train composition 500 among one or more wireless devices that have made the inquiry. Among the plurality of wireless devices 700, 720, 740, and 760 installed on the ground, the wireless device that has received the connection permission communicates with the wireless device 600 installed on the train composition 500.

The function in which one wireless device of the plurality of wireless devices 700, 720, 740, and 760 installed on the ground receives an inquiry about connection permission with the wireless device 600 installed on the train composition 500 from some wireless device other than the one wireless device of the plurality of wireless devices 700, 720, 740, and 760, and then the one wireless device gives connection permission to the wireless device at the rearmost in the traveling direction of the train composition 500 among one or more wireless devices that have made the inquiry shifts to wireless devices installed on the front side in the traveling direction of the train composition 500 in order from the wireless device 700 that the train composition 500 approaches first among the plurality of wireless devices 700, 720, 740, and 760 installed on the ground at the following timing in accordance with the movement of the train composition 500. The timing is a timing calculated from the specified traveling speed at the installation place of the plurality of wireless devices 700, 720, 740, and 760 installed on the ground and the installation position of the wireless device 600 installed on the train composition 500.

When the plurality of wireless devices 700, 720, 740, and 760 installed on the ground and the wireless device 600 installed on the train composition 500 perform communication using proximity service, a first wireless device among the plurality of wireless devices 700, 720, 740, and 760 notifies a second wireless device among the plurality of wireless devices 700, 720, 740, and 760 of information necessary for performing link establishment and security authentication with the wireless device 600 installed on the train composition 500. In accordance with the movement of the train composition 500, the wireless device that communicates with the wireless device 600 installed on the train composition 500 is switched among the wireless devices 700, 720, 740, and 760 installed on the ground at a timing calculated from the specified traveling speed at the installation place of the plurality of wireless devices 700, 720, 740, and 760 installed on the ground and the installation position of the wireless device 600 installed on the train composition 500.

Fourth Embodiment

In the third embodiment, data is transmitted from the vehicle to the ground by ProSe groupcast between the wireless device 600 installed on the train composition 500 and the wireless devices 700, 720, 740, and 760 on the ground. In the fourth embodiment, data is transmitted from the vehicle to the ground by ProSe unicast between the wireless device 600 installed on the train composition 500 and the wireless devices 700, 720, 740, and 760 on the ground.

Figure 10:
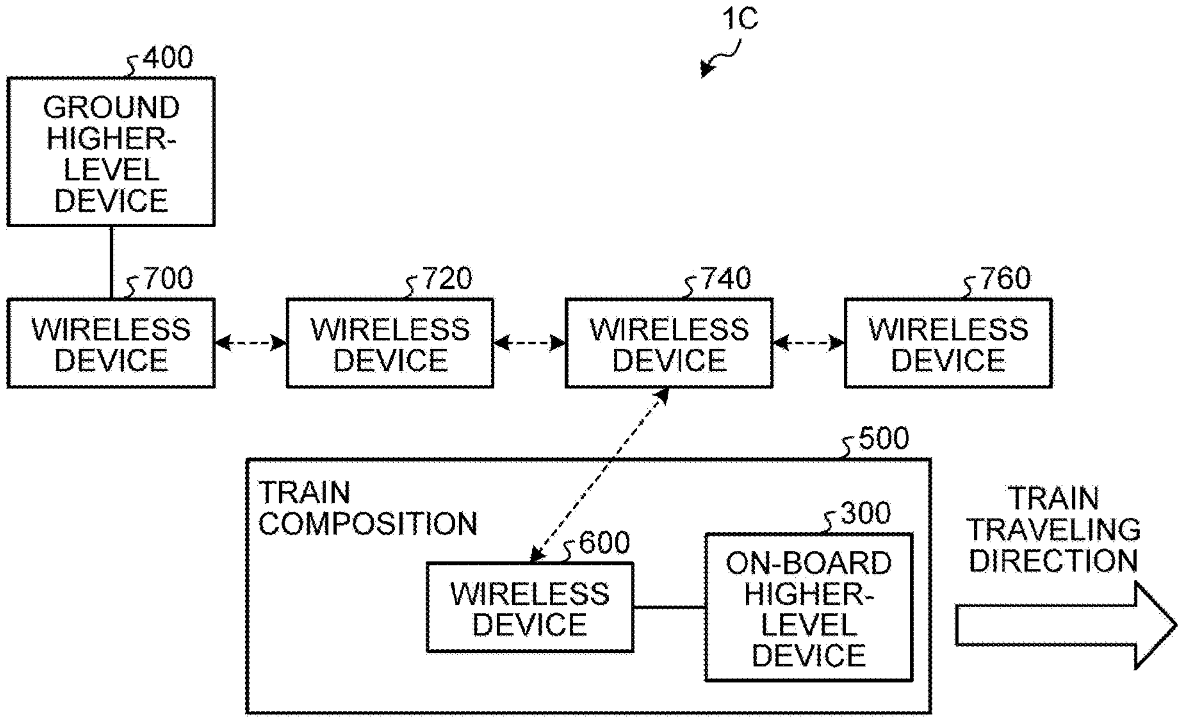
FIG. 10 is a diagram illustrating a configuration of a T2X system according to a fourth embodiment.

FIG. 10 is a diagram illustrating a configuration of a T2X system 1C according to the fourth embodiment. The wireless device 700, the wireless device 720, the wireless device 740, and the wireless device 760 have the same ProSe UE ID, and belong to the same ProSe Layer-2 Group. The wireless device 600 installed on the train composition 500 communicates with the wireless device 700, the wireless device 720, the wireless device 740, and the wireless device 760 on the ground by ProSe unicast. Although FIG. 10 shows that the four wireless devices 700, 720, 740, and 760 are installed on the ground, the number of wireless devices installed on the ground only needs to be two or more. Although FIG. 10 shows that the wireless device 600 communicates with the wireless device 740, the wireless device 600 can communicate with any wireless device on the ground as long as it is within the communicable range.

The operation of each device in the fourth embodiment is similar to the operation of each device in the second embodiment illustrated in FIG. 8, except that the wireless device 200 is replaced with the wireless device 600, the wireless device 100 is replaced with the wireless device 700, the wireless device 120 is replaced with the wireless device 720, the wireless device 140 is replaced with the wireless device 740, the wireless device 160 is replaced with the wireless device 760, the ground higher-level device 400 is replaced with the on-board higher-level device 300, and the on-board higher-level device 300 is replaced with the ground higher-level device 400.

The effect obtained in the fourth embodiment is the same as the effect obtained in the third embodiment.

The wireless system according to the present disclosure can achieve the effect of allowing the operator of a train to efficiently conduct the work of monitoring obstacles on the track while reducing the overload of wireless bandwidth in a plurality of wireless devices on the vehicle.

The configurations described in the above-mentioned embodiments indicate examples. The embodiments can be combined with another well-known technique and with each other, and some of the configurations can be omitted or changed in a range not departing from the gist.

The invention claimed is:

1. A wireless system comprising:

a wireless device installed on a ground along a track; and a plurality of wireless devices installed on a train in a line from a head side to a rear side of the train, wherein in response to the wireless device installed on the ground and the plurality of wireless devices installed on the train performing communication using proximity service, a limitation is placed on the plurality of wireless devices such that only one of the plurality of wireless devices is connected to the wireless device installed on the ground, among the plurality of wireless devices installed on the train, the wireless device installed not at a head in a traveling direction of the train makes, upon detecting the wireless device installed on the ground, an inquiry about connection permission with the wireless device installed on the ground to the wireless device installed at the head in the traveling direction of the train among the plurality of wireless devices, upon receiving the inquiry about connection permission with the wireless device installed on the ground from the wireless device installed not at the head, the wireless device installed at the head in the traveling direction of the train gives connection permission to the wireless device installed at a position closest to the head in the traveling direction of the train among one or more wireless devices that have made the inquiry, and among the plurality of wireless devices installed on the train, the wireless device that has received the connection permission communicates with the wireless device installed on the ground.

2. The wireless system according to claim 1, wherein a function in which one wireless device of the plurality of wireless devices installed on the train receives an inquiry about connection permission with the wireless device installed on the ground from some wireless device other than the one wireless device of the plurality of wireless devices, and then the one wireless device gives connection permission to the wireless device installed at a position closest to the head in the traveling direction of the train among one or more wireless devices that have made the inquiry is shifted to subsequent wireless devices in order from the wireless device installed at the head in the traveling direction of the train among the plurality of wireless devices installed on the train in accordance with movement of the train at a timing calculated from a speed of the train, an acceleration of the train, and a distance between adjacent wireless devices of the plurality of wireless devices installed on the train, or a timing calculated from a specified traveling speed at an installation place of the wireless device installed on the ground and an installation position of the plurality of wireless devices installed on the train.

3. A ground-vehicle transmission method for a wireless system including a wireless device installed on a ground along a track, and a plurality of wireless devices installed on a train in a line from a head side to a rear side of the train, the ground-vehicle transmission method comprising:

a step of, in response to the wireless device installed on the ground and the plurality of wireless devices installed on the train performing communication, placing a limitation on the plurality of wireless devices such that only one of the plurality of wireless devices is connected to the wireless device installed on the ground;

a step in which among the plurality of wireless devices installed on the train, the wireless device installed not at a head in a traveling direction of the train makes, upon detecting the wireless device installed on the ground, an inquiry about connection permission with the wireless device installed on the ground to the wireless device installed at the head in the traveling direction of the train among the plurality of wireless devices;

a step in which upon receiving the inquiry about connection permission with the wireless device installed on the ground from the wireless device installed not at the head, the wireless device installed at the head in the traveling direction of the train gives connection permission to the wireless device installed at a position closest to the head in the traveling direction of the train among one or more wireless devices that have made the inquiry; and a step in which among the plurality of wireless devices installed on the train, the wireless device that has received the connection permission communicates with the wireless device installed on the ground.

4. The ground-vehicle transmission method according to claim 3, wherein the wireless device installed on the ground and the plurality of wireless devices installed on the train perform data communication and inquiry about connection permission at different timings using scheduling of proximity service.

5. A wireless system comprising:

a plurality of wireless devices installed on a ground in a line along a track; and a wireless device installed on a train, wherein in response to the plurality of wireless devices installed on the ground and the wireless device installed on the train performing communication using proximity service, a limitation is placed on the plurality of wireless devices installed on the ground such that only one of the plurality of wireless devices installed on the ground is connected to the wireless device installed on the train, among the plurality of wireless devices installed on the ground, the wireless device different from the wireless device that the train approaches first makes, upon detecting the wireless device installed on the train, an inquiry about connection permission with the wireless device installed on the train to the wireless device that the train approaches first among the plurality of wireless devices, upon receiving the inquiry about connection permission with the wireless device installed on the train from the wireless device different from the wireless device that the train approaches first, the wireless device that the train approaches first gives connection permission to the wireless device at a rearmost in a traveling direction of the train among one or more wireless devices that have made the inquiry, and among the plurality of wireless devices installed on the ground, the wireless device that has received the connection permission communicates with the wireless device installed on the train.

6. The wireless system according to claim 5, wherein a function in which one wireless device of the plurality of wireless devices installed on the ground receives an inquiry about connection permission with the wireless device installed on the train from some wireless device other than the one wireless device of the plurality of wireless devices, and then the one wireless device gives connection permission to the wireless device installed at a rearmost in the traveling direction of the train among one or more wireless devices that have made the inquiry is shifted to wireless devices installed on a front side in the traveling direction of the train in order from the wireless device that the train approaches first among the plurality of wireless devices installed on the ground in accordance with movement of the train at a timing calculated from a specified traveling speed at an installation place of the plurality of wireless devices installed on the ground and an installation position of the wireless device installed on the train.

* * * * *